United States Patent [19]

Gruenberg

[11] 4,339,818

[45] Jul. 13, 1982

[54] DIGITAL MULTIPLEXER WITH INCREASED CHANNEL CAPACITY

[75] Inventor: Elliot L. Gruenberg, West New York, N.J.

[73] Assignee: BroadCom, Incorporated, West New York, N.J.

[21] Appl. No.: 145,348

[22] Filed: Apr. 30, 1980

[51] Int. Cl.³ .................................................. H04J 3/18
[52] U.S. Cl. .................................... 370/112; 370/118; 179/15.55 R
[58] Field of Search ................. 370/11, 112, 118, 77; 179/15.55 R, 15.55 T; 340/870.13; 375/25

[56] References Cited

U.S. PATENT DOCUMENTS

| | | | |
|---|---|---|---|
| 3,030,614 | 4/1962 | Lehan | 179/15.55 R |
| 3,238,298 | 3/1966 | Willis | 179/15.55 R |
| 3,299,204 | 1/1967 | Cherry | 370/118 |

Primary Examiner—Benedict V. Safourek
Assistant Examiner—Stephen Chin
Attorney, Agent, or Firm—Lieberman, Rudolph & Nowak

[57] ABSTRACT

A digital multiplexer accommodates a large number of voice channels per digital channel through use of an improved statistical coding technique. Analog information on the voice channels is encoded into multibit digital words by PCM encoders and the bit position at the output of each PCM encoder is staggered such that a predetermined bit in each word is presented at different times to encoder outputs. The multibit digital words are converted to multibit digital code words and the code words are in turn converted into a PAM signal for transmission over a communications highway. Bit staggering advantageously allows the use of a minimum number of PAM signal levels in comparison to prior art techniques.

An executive conferencing arrangement is also provided wherein PCM encoder outputs from a plurality of communications channels are multiplied by predetermined analog voltages, the analog voltages are summed from each channel and the sum is subtracted from a fixed analog voltage whose value is dependent on the number of communications channels. The difference signal is utilized to set up a conferencing arrangement wherein each communications channel carrying analog information is connected to each communications channel not carrying analog information.

8 Claims, 8 Drawing Figures

DIGITAL MULTIPLEXER WITH INCREASED CHANNEL CAPACITY

FIELD OF THE INVENTION

This invention relates to digital multiplexers and more particularly to a digital multiplexer capable of accommodating a large number of voice channels per digital channel through use of an improved statistical coding technique.

BACKGROUND OF THE INVENTION

Digital communications systems for the transmission of voice and data are becoming increasingly prevalent. This growth is exemplified by recent Bell System Offerings, such as the Bell System's Digital Data System and numerous private common carrier offerings of digital service between major cities. An important factor in the use of the various private systems has been the advent of signle channel CODEC units, such as the CODEC TP 3000 series. This unit permits digital transmission service to be provided at a bit rate as low as 64KbS, making possible the use of microwave transmission bands previously available for analog service only.

The increase in digital service at lower bit rates has heightened the need for a digital multiplexer capable of accommodating a large number of analog channels per digital channel. One such multiplexer is shown in U.S. Pat. No. 3,492,432, granted to L. G. Schimpf on Jan. 27, 1970. In Schimpf three incoming analog channels are sampled and encoded into Pulse Code Modulation (PCM) signals by three individual five digit serial encoders. The serial encoder outputs are delayed by predetermined amounts to allow sampling of the time-coincident serial output bits in a predetermined sequence. Each group of successively sampled PCM bits is then converted into a quantized Pulse Amplitude Modulated (PAM) signal which is representative of a sampled group of PCM bits. The PAM signal is then transmitted to a receiving terminal where it is decoded into a plurality of respective PCM signals having bit patterns identical to the original encoded analog signals.

Although Schimpf achieves a reduction in intermodulation distortion and saves bandwidth, he requires the use of a separate PAM signal level for each possible combination of the "1" and "0" output bits of the PCM encoders, that is, Schimpf requires an eight level PAM signal to represent three analog channels. It is apparent that if the number of PAM signal levels could be reduced from the maximum required by Schimpf a marked increase would be achieved in multiplexer capacity.

It is therefore an object of the present invention to improve the capacity of a digital multiplexer.

It is a further object of the present invention to provide a digital multiplexer accommodating the largest possible number of analog channels per digital channel.

It is an additional object of the present invention to transmit a plurality of analog signals over a single channel with a minimum amount of bandwidth.

SUMMARY OF THE INVENTION

In accordance with the instant invention a plurality of input channels carry analog information for transmission over a communications highway. The analog information is serially encoded into a sequence of multibit digital words by PCM encoders associated with each input channel.

It is a feature of the invention that the bit position of each multibit digital word is controlled at the output of the PCM encoders such that a predetermined bit in each word is presented at different times to outputs of each of the PCM encoders.

It is another feature of the invention that the multibit digital words are converted into multibit digital code words and that each bit of each code word is multiplied by a different analog voltage.

It is a further feature of the invention that the analog voltages from each input channel are summed for transmission to a remote location over the communications highway.

It is a still further feature of the invention that a first half of the multibit digital code words are multiplied by generally positive going analog voltages while a second half of the multibit digital code words are multiplied by generally negative going analog voltages. A leading half of the generally positive going analog voltages and a lagging half of the generally negative going analog voltages are combined for transmission over the communications highway.

In accordance with another aspect of the instant invention an executive conferencing arrangement is provided wherein a plurality of communications channels carry analog information and the analog information is encoded into a sequence of multibit digital words.

It is another feature of the invention that the digital word bits from each channel are multiplied by a predetermined analog voltage, with the analog voltage being different for each channel.

It is a still further feature of the invention that the analog voltages from each channel are summed and subtracted from a fixed voltage and that the difference signal is utilized to generate a multibit code word, the bits of the code word being used to set up a conferencing arrangement wherein each channel carrying analog information is connected to each channel not carrying analog information.

The foregoing and other objects and features of this invention will be more fully understood from the following description of an illustrative embodiment thereof taken in conjunction with the accompanying drawings.

DETAILED DESCRIPTION

Figure 1:
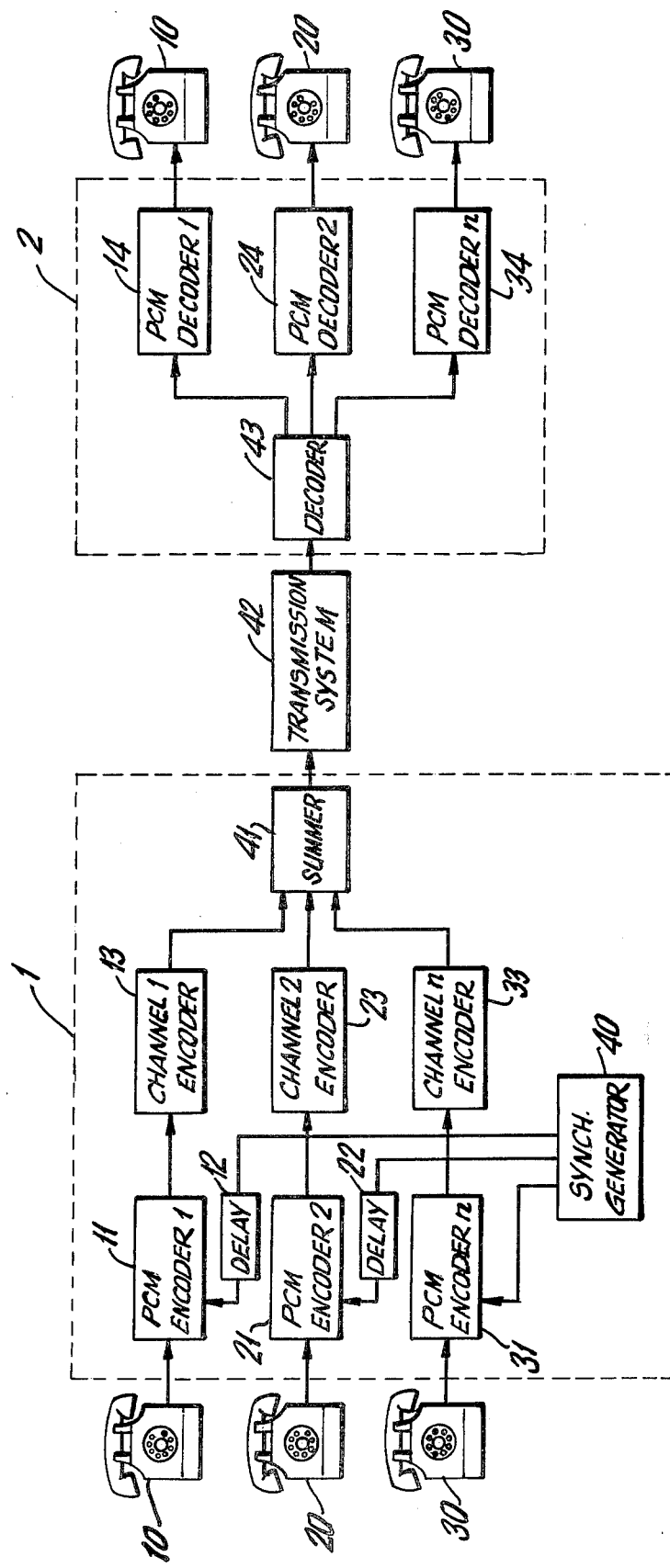
FIG. 1 illustrates, in block diagram form, a first embodiment of the invention.

It is helpful in understanding the features and advantages of the present invention to explain in somewhat greater detail the operation of the prior art Schimp multiplexer. In Schimpf the outputs of the three PCM five-digit serial encoders are simultaneously presented at five parallel output leads. The first of the five parallel bits from each of the three encoders is applied to a gating circuit through delay circuitry such that the output of the gating circuit consists of the first three bits from all three encoders being outputted in sequence. This is followed by the second of the five parallel bits from all three encoders, etc. Each three bit sequence is then converted into one specific level of an eight level PAM signal. An example of this type of encoding is illustrated by the following table:

TABLE I

| CHANNEL NO. | 1 | 2 | 3 | Output Code |
|---|---|---|---|---|
| | 0 | 0 | 0 | 0 |
| | 1 | 0 | 0 | 1 |
| Possible Output | 0 | 1 | 0 | 2 |
| From Three PCM | 1 | 1 | 0 | 3 |
| Encoders | 0 | 0 | 1 | 4 |
| | 1 | 0 | 1 | 5 |
| | 0 | 1 | 1 | 6 |
| | 1 | 1 | 1 | 7 |

As illustrated a unique output code is generated for each possible combination of encoder outputs. However, if the expectation would be that no more than one logical "1" bit would be present at any channel output the PAM encoder would only be required to produce a signal having one amplitude level for each channel i.e., a three level PAM signal for three channels. Stated another way, if simultaneous "1" bits from the three PCM encoders could be eliminated, than only the channel having a logical "1" output would have to be identified by the multilevel PAM signal. The result would be the representation of a greater number of analog channels with the same PAM signal than was possible with prior art digital multiplexers. The instant invention accomplishes this objective by making the frequency of multiple simultaneous "1" bits extremely small.

The frequency of logical "1" bits in a PCM encoder output, when used for the transmission of voice, is dependent upon:
1. The frequency of conversation.
2. The two-way effect i.e., only one speaker is usually talking.
3. Gaps in speech during conversation.
4. The probability of particular levels being reached in the amplitude encoding.

The first three factors affect the probability that any channel is being used at all. An estimate of such utilization depends upon traffic experience and a figure of 0.07 to 0.10 is a reasonable average representing the probability of a logical "1" bit existing in any channel.

The fourth factor depends upon the amplitude statistics of the voice level. An expression for this amplitude distribution is:

$$P(x) = \frac{1}{\sqrt{2}\,\sigma} \exp\left(-\sqrt{2}\,\frac{|x|}{\sigma}\right)$$

where
x = instantaneous speech voltage level
σ = RMS speech voltage

Assume for purposes of describing the instant invention that there are 7 analog input channels with the RMS speech voltage equal to 1.4 V. Seven analog inputs would normally require a 128 level PAM signal with the probability of utilization for the various PAM amplitude levels being as follows when calculated in accordance with the foregoing equation:

TABLE II

| Level + or − | Probability |
|---|---|
| 1 | 0.1959 |
| 2 | 0.119 |
| 4 | 0.117 |
| 8 | 0.059 |
| 16 | 0.009 |
| 32 | 0.0002 |
| 64 | Negligible |
| 128 | Negligible |

It is important to note how infrequently levels above the second level occur.

As stated above an objective of the present invention is to reduce the number of PAM levels required to only one level per analog channel i.e. a seven level signal for seven input channels rather than the 128 levels presently required. A code which would provide equal % distortion error for all levels and which would require no more than one level or one bit (plus sign bit) per each code is shown in Table III.

TABLE III

| Level | + or − | Bit Position | | | | | | |
|---|---|---|---|---|---|---|---|---|
| | | 1 | 2 | 3 | 4 | 5 | 6 | 7 |
| 0 | 0 | 0 | 0 | 0 | 0 | 0 | 0 | 0 |
| 1 | 1 | 0 | 0 | 0 | 0 | 0 | 0 | 1 |
| 2 | 2–3 | 0 | 0 | 0 | 0 | 0 | 1 | 0 |
| 3 | 4–7 | 0 | 0 | 0 | 0 | 1 | 0 | 0 |
| 4 | 8–15 | 0 | 0 | 0 | 1 | 0 | 0 | 0 |
| 5 | 16–31 | 0 | 0 | 1 | 0 | 0 | 0 | 0 |
| 6 | 32–63 | 0 | 1 | 0 | 0 | 0 | 0 | 0 |
| 7 | 64–128 | 1 | 0 | 0 | 0 | 0 | 0 | 0 |

Use of this code insures that only one bit from each channel would be present during each bit position for the seven amplitude bits. An eighth bit for sign would also be sent.

The overall probabilities that any of these bits would be sent are the products of the channel utilization probabilities and the level probabilities of Table II. These are shown in Table IV.

TABLE IV

| Level No. | Bit Probability (Utilization P = .1) |
|---|---|
| 0 | 0.01959 |
| 1 | 0.0119 |
| 2 | 0.0017 |
| 3 | 0.0059 |
| 4 | 0.0009 |
| 5 | 0.00017 |
| 6 | Neg. |
| 7 | Neg. |

The sign bit probability would be the probability of a level bit multiplied by 0.5, since there is a 50% probability of either a positive or negative value, of any level.

The probability of a bit occurring in any two channels, for activity which is uncorrelated and overwhelmingly the general case, is the product of level probabilities in the two channels. The total probability of any two bits would be the sum of these probabilities.

If the parallel channels were channel synchronized so that bit position 8 for example would occur at the same time in all channels the probability of coincidence in this position would be enhanced because level 1 is by far the most probable. In the present invention, however, the bit position is deliberately staggered so that bit position 8 occurs at a different time in each channel as shown below in Table V.

TABLE V

| | | BIT POSITION | | | | | | | | | | | | | | |
|---|---|---|---|---|---|---|---|---|---|---|---|---|---|---|---|---|
| | Interval | 1 | 2 | 3 | 4 | 5 | 6 | 7 | 8 | 1 | 2 | 3 | 4 | 5 | 6 | 7 | 8 |
| Channel | 1 | 1 | 2 | 3 | 4 | 5 | 6 | 7 | 8 | 1 | 2 | 3 | 4 | 5 | 6 | 7 | 8 |
| | 2 | 8 | 1 | 2 | 3 | 4 | 5 | 6 | 7 | 8 | 1 | 2 | 3 | 4 | 5 | 6 | 7 |
| | 3 | 7 | 8 | 1 | 2 | 3 | 4 | 5 | 6 | 7 | 8 | 1 | 2 | 3 | 4 | 5 | 6 |
| | 4 | 6 | 7 | 8 | 1 | 2 | 3 | 4 | 5 | 6 | 7 | 8 | 1 | 2 | 3 | 4 | 5 |
| | 5 | 5 | 6 | 7 | 8 | 1 | 2 | 3 | 4 | 5 | 6 | 7 | 8 | 1 | 2 | 3 | 4 |
| | 6 | 4 | 5 | 6 | 7 | 8 | 1 | 2 | 3 | 4 | 5 | 6 | 7 | 8 | 1 | 2 | 3 |

Thus, the major probability in each bit position is the level 1 bit and the probability of two level bits occurring simultaneously is extremely rare. The highest probability of a coincidence is for simultaneous levels 1 and 2 and is $0.0119 \times 0.0017 = 2.023 \times 10^{-5}$. This opportunity for levels 1 and 2 to occur in each bit position will be present if 8 channels were transmitted simultaneously. The next worst case would be simultaneous levels 1 and 3. This probability is $0.0019 \times 0.0059 = 7.021 \times 10^{-5}$ and is negligible.

When the small errors caused by levels 1 and 2 bit coincidence can be tolerated, then only the number of the channel carrying the bit need be sent and transmission would be typified by the following channel number sequence:

7 0 0 4 0 2 0 1 2 7 6

When greater error immunity is desired, it would be necessary to provide code numbers for the cases when two channels may be transmitting bits. The codes are, for example:

TABLE VI

| Code | Channel | Code | Channel | Code | Channel |
|---|---|---|---|---|---|
| 1 | 1 | 9 | 1 and 2 | 16 | 2 and 3 |
| 2 | 2 | 10 | 1 and 3 | 17 | 2 and 4 |
| 3 | 3 | 11 | 1 and 4 | 18 | 2 and 5 |
| 4 | 4 | 12 | 1 and 5 | 19 | 2 and 6 |
| 5 | 5 | 13 | 1 and 6 | 20 | 2 and 7 |
| 6 | 6 | 14 | 1 and 7 | 21 | 2 and 8 |
| 7 | 7 | | | | |
| 8 | 8 | | | | |
| 22 | 3 and 4 | 27 | 4 and 5 | 31 | 5 and 6 |
| 23 | 3 and 5 | 28 | 4 and 6 | 32 | 5 and 7 |
| 24 | 3 and 6 | 29 | 4 and 7 | 33 | 5 and 8 |
| 25 | 3 and 7 | 30 | 4 and 8 | 34 | 6 and 7 |
| 26 | 3 and 7 | | | 35 | 6 and 8 |
| | | | | 36 | 7 and 8 |

The advantage of the coding of the instant invention over ordinary pulse amplitude modulation (PAM) is that the same information can be transmitted with much lower power levels. Alternatively, more channels may be transmitted with the same power. For example, for the $10^{-4}$ error rate case and 8 channels, 44 codes may be used to transmit 16 channels; i.e., the 36 codes just above, plus eight codes for the second set of channels only. The advantage with respect to PCM coding is that many more voice channels may be transmitted over the same bandwidth. A preferred embodiment of the invention will now be described in detail.

FIG. 1 illustrates an overall view of a digital communications system in accordance with the instant invention. Incoming voice frequency signals are generated by telephones 10, 20 and 30, and applied to PCM encoders 11, 21 and 31 included in multiplexer 1. Each telephone represents a separate input channel and a separate PCM encoder is provided for each channel. Although only three input channels are shown it will be understood that any number of channels can be provided with the preferred number of channels being equal to 8. PCM encoders 11, 21 and 31 encode the voice frequency signals into a serial digital word in a manner well known in the art. A representative PCM encoder is illustrated in the patent to Schimpf. In the particular embodiment shown in FIG. 1, the PCM encoders preferably sample the voice frequency signals at an 8 Khz rate and serially convert this sample into an 8 bit digital word. Encoder operation is controlled by synch generator 40 which controls the channel start time of the PCM code, i.e., the time each bit in the PCM digital word is presented to the encoder output.

Synch generator 40 provides channel synch pulses which are coincident with bit position 8 in the 8-bit serial word. Each PCM encoder receives this synch pulse delayed by a separate and predetermined interval of time equal to a different number of bit positions. The required delay is provided by delay units 12 and 22. Controlling the synchronization of each PCM encoder in this manner ensures that bit-8 of each PCM code commences at a different time. This advantageously achieves the necessary bit staggering illustrated in Table V.

The output of each PCM encoder is presented to channel encoders 13, 23 and 33. It is the function of the channel encoders to convert the output from each PCM encoder into the code illustrated in Table III, hereinafter referred to as the nearest bit approximate code. Such a conversion is readily accomplished by storing the PCM code in a register, examining the PCM code with appropriate digital logic or a properly programmed microprocessor to establish the numerical range of the code, and generating the nearest bit approximate code to replace the PCM code. As the circuitry necessary to perform such a conversion is well known to one skilled in the art of digital logic design the circuit details will not be further described. The nearest bit approximate code is generated once per 8-bit interval and placed in an output register (not shown).

As illustrated in Table III, the nearest bit approximate code contains a single "1" bit for each of the 8 input channels. Each of the channel encoders 13, 23 and 33 further include circuitry, such as illustrated in the patent to Schimpf, which successively multiplies each bit from each channel with a calibrated analog voltage unique to the particular channel represented by that bit. Thus channel encoder 13 would operate on the nearest bit approximate code stored in the output register and multiply channel 1 by a level 1 calibrated voltage, encoder 23 would multiply channel 2 by a level 2 analog voltage, etc. The outputs from the channel encoders are summed for each bit interval by summer 41. Since no more than one channel is expected to supply a non zero output, the output of summer 41 for each bit position will be either a zero or a number (level) corresponding to the transmitting channel.

The output of summer 41 is sent via transmission system 42. This system may include modulation means to convert the amplitude coded signals to frequency or phase modulation or to modulate a radio frequency link. The instant invention can be utilized with any transmission system capable of accepting a PAM signal.

At the receiving end the demodulated amplitude coded signals are decoded by decoder 43 included in demultiplexer 2. Decoder 43 is calibrated to convert the PAM signals into a parallel binary code. It does this by comparing the amplitudes occurring in each bit interval with standard voltages. When voltages lie in the specific correct range a comparator for that voltage will generate a "1" bit. For example, if the amplitude 2 is received a comparator will set a "1" bit if the number is greater than 1½, but the comparator will change this bit to zero if the voltage is greater than 2½. Thus, the comparator system would generate a "1" bit for channel 2 if and only if a value close to value of level 2 had been received. Such decoders are well known in PAM systems (see the Schimpf patent) and will not be further detailed herein. The output of decoder 43 comprises a number of binary bits which indicate the correct channel numbers transmitted and these bits are placed in an output register (not shown) having a separate position for each channel. The register is interrogated by a sampling pulse at a rate greater than the bit position transmission rate. Each position of the register is connected to separate PCM decoders 14, 24, 34. These decoders convert the coded signals to voice frequency signals, which can properly activate the earpieces of telephones 10, 20 and 30.

The embodiment just described assumes that only one channel is supplying a non-zero output. When two channels transmit, which is rare, an error will occur. If the resultant low error rate cannot be tolerated the embodiment shown in FIG. 2 can be used to provide greater error immunity.

Figure 2:
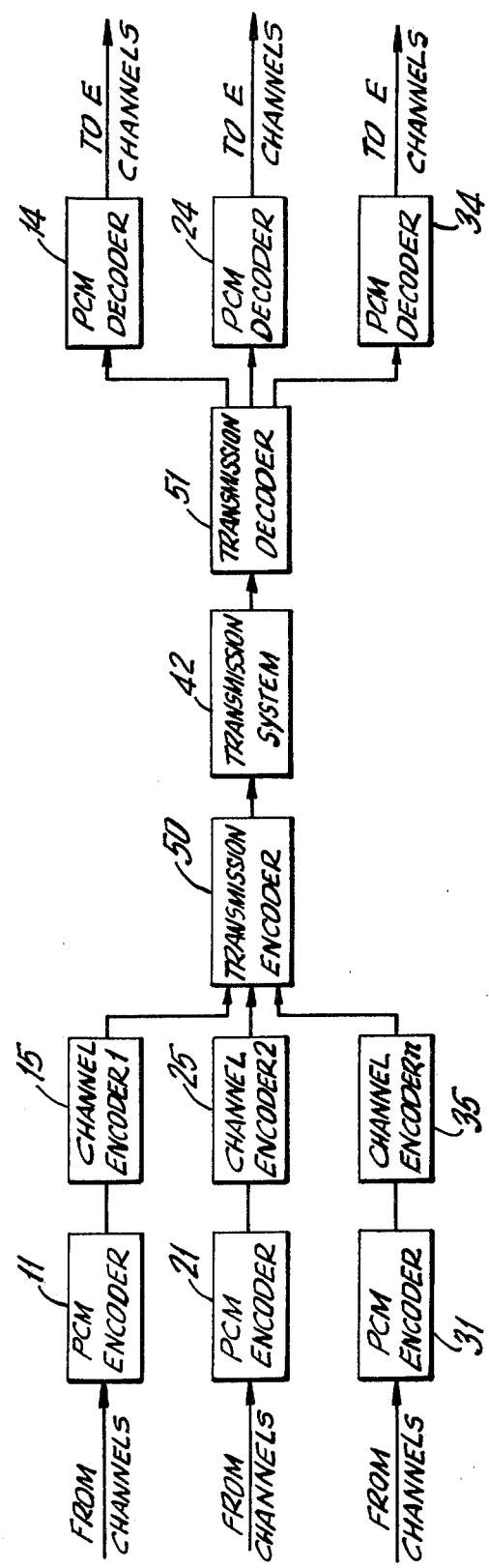
FIG. 2 illustrates a second embodiment of the invention to achieve greater error immunity.

Table VI illustrates the coding utilized to provide greater error immunity and this coding scheme is implemented by the system shown in FIG. 2. In FIG. 2 channel encoders 15, 25 and 35 replace the encoders 13, 23 and 33 of FIG. 1. Encoders 15, 25 and 35 perform only the function of converting standard PCM codes to the nearest bit approximate code but do not multiply the code with the channel identifying amplitude voltage. Summer 41 is replaced by transmission encoder 50.

Transmission encoder 50 interrogates each channel encoder register bit and determines in which channel "1" bits are present. The encoder than generates an appropriate code pursuant to Table VI. The code generator of encoder 50 can be implemented in a number of ways. For example, a Read Only Memory (ROM) could be used as a look-up table to generate the proper code in response to the presence of "1" bits in the various channels. The correct PAM level is then produced in response to the generated code and is done in the manner taught by Schimpf i.e., the described voltage level is generated by a voltage divider fed from a standard voltage which operates on each "1" bit in the output code. As the operation of encoder 50 is apparent to one skilled in the art further circuit details will not be given. Transmission decoder 51 decodes the transmitted PAM signals through use of an appropriate PAM decoder and ROM. Encoders 11, 21 and 31 and decoders 14, 24 and 34 function in the manner described above.

The embodiments of the invention just described greatly improve system efficiency over prior art multiplexers such as shown in Schimpf. However even greater efficiency can be achieved through use of a positive and negative coding scheme.

Figure 3A:
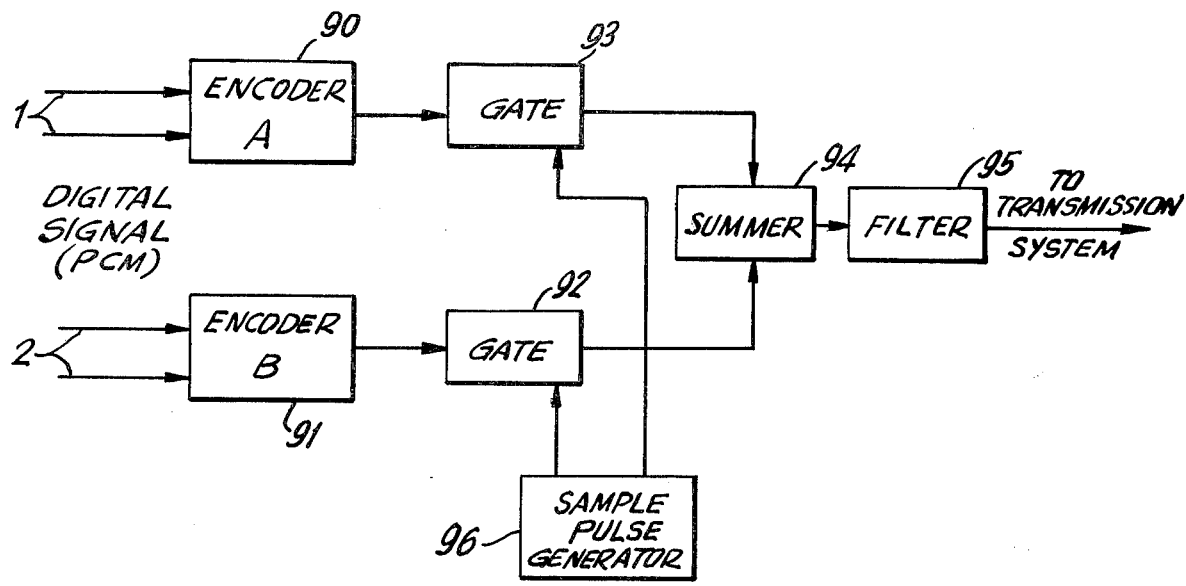
FIGS. 3A and 3B illustrates another embodiment of the invention directed to plus and minus coding techniques.

The objective of the positive and negative coding scheme is to permit the combined transmission from two encoders over a common transmission band while providing separate recovery from each encoder. Referring to FIG. 3A, encoder 90 accepts PCM signals such as are produced by PCM encoders 11, 21 and 31 and generates PAM signals in accordance with the teachings described above. However the PAM outputs from encoder 90 are transmitted by generally positive going signals. Encoder 91 also accepts PCM signals and generates PAM signals in accordance with the instant invention. However, the PAM outputs from encoder 91 are transmitted by generally negative going signals.

The PAM outputs from encoder 90 are applied to gate 93 which is selectively enabled by pulse generator 96 to sample the leading half of the PAM bit interval. The output of gate 93 is fed to summer 94. At the same time the PAM outputs from encoder 91 are applied to gate 92 which is selectively enabled by pulse generator 96 to sample the lagging half of the PAM bit interval. The outputs from gate 92 are also applied to summer 94. It is of course appreciated that the negative going pulses from encoder 91 are generated by using a negative rather than a positive standard voltage. FIG. 3C shows a typical output of summer 94. A bit interval is twice the encoder(A) 90 or encoder(B) 91 pulse widths. Encoder 90 pulses are always positive and encoder 91 pulses always negative. Filter 95 changes the half bit interval pulses into approximately half sine waves occupying a full bit interval as shown in the upper diagram of FIG. 3D. The actual output is the sum of these pulses as shown in the lower diagram of FIG. 3D. This diagram shows that true values of encoder 90 pulses occur at regular intervals which are a bit interval $T_B$ apart and are positive, while true encoder 91 pulse amplitudes also occur at $T_B$ intervals, but they are negative and these intervals are separated by $T_{B/2}$ from the encoder 90 pulses. Thus, no increase in bandwidth has occurred even though twice the number of channels is accommodated.

Figure 3B:
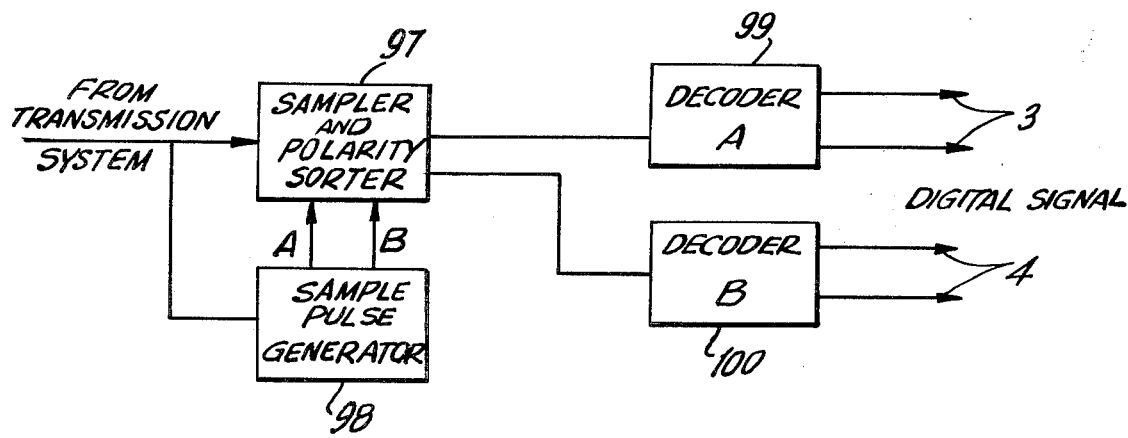
Figure 3C:
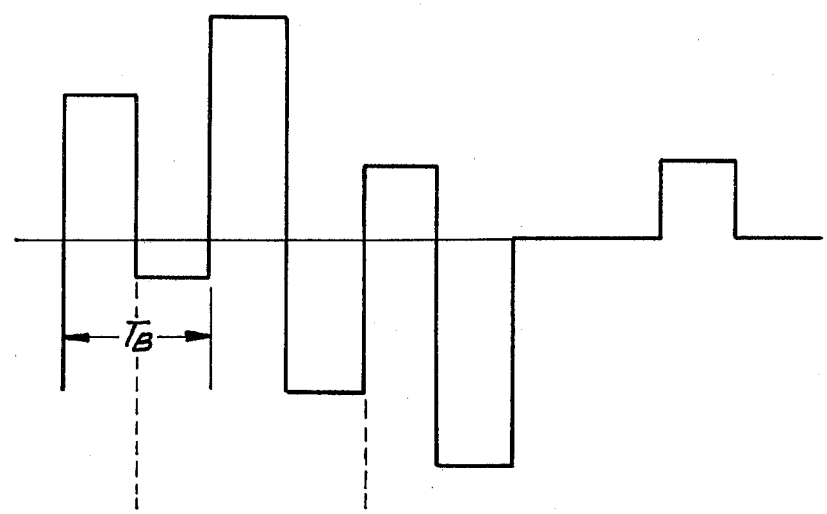
FIGS. 3C and 3D illustrates wave forms occurring in the embodiment of FIGS. 3A and 3B.
Figure 3D:
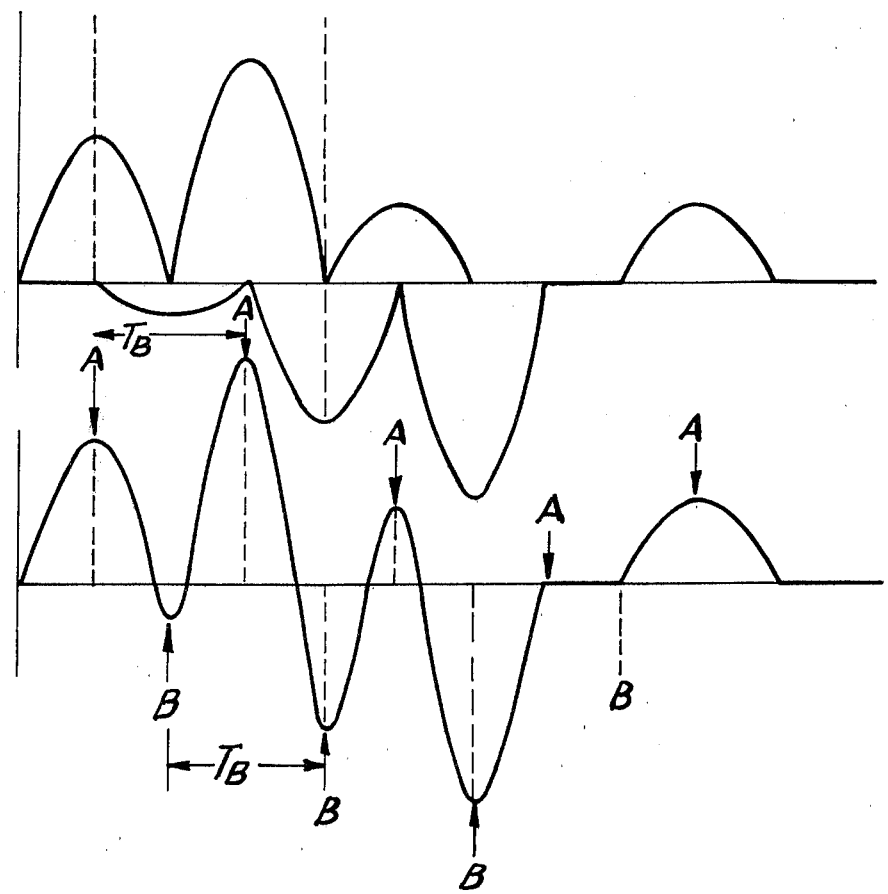

FIG. 3B illustrates a preferred decoder implementation. Sampling generator 98 is synchronized to the incoming pulse rate (bit rate). Using pulses from 98, sorter 97 samples the incoming signal at the decoder (A) 99 intervals and the decoder (B) 100 intervals. When decoder 99 intervals are sampled sorter 97 permits positive signals to be sent to decoder 99. Decoder 99 converts these pulses into a multichannel PCM signal output. At encoder (B) 100 intervals, which occur $T_{B/2}$ after encoder 99 intervals, generator 98 samples the incoming signal and derives true negative pulse values which are then passed on to decoder 100. Decoder 100 converts these signals into PCM signals for conversion to voice signals.

Figure 4:
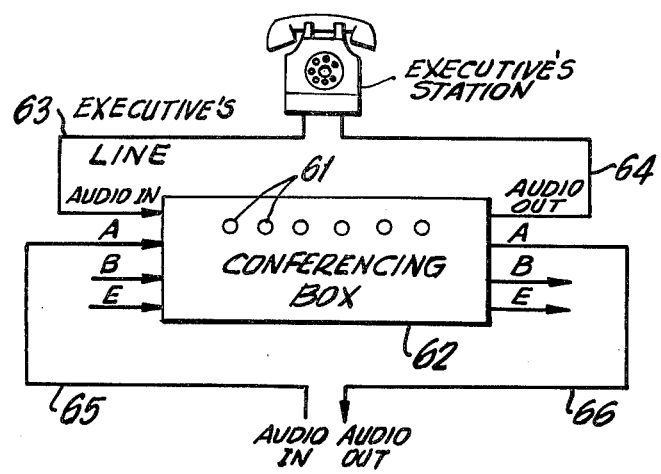
FIG. 4 illustrates a further embodiment of the invention directed to executive conferences.

Another aspect of the instant invention is an executive conferencing arrangement illustrated in FIG. 4 wherein an executive can conference with a number of remote individuals. Referring to FIG. 4, station 60 is an executive input device transmitting audio frequencies on line 63 and receiving audio frequencies on line 64. Lines 65 and 66 represent audio in an audio out respectfully for another individual (A) involved in the conference with additional inputs and outputs shown for individuals B, E, etc.

The function of conferencing box 62 is to permit the executive to contact other individuals for a conference and permit each non-talking party to hear all talking parties after the conference commences. To this end all audio inputs to conferencing box 62 are converted into a digital (PCM) code. Each PCM word for each speaker is then weighted differently according to the following format:

TABLE VII

| Input | Wgt. |
|---|---|
| Exec. | 1 |
| A | 2 |
| B | 4 |
| C | 8 |
| D | 16 |
| E | 32 |

As stated above the object of this embodiment is to provide a means for the input at any or several ports to be heard at all ports other than the originating port(s). This can be accomplished if the weighted bits are summed and the sum subtracted from 63 (for an example of six inputs). The outputs to each party will then be in accordance with the following table:

TABLE VIII

| (1) Talking Party(s) | (2) Sum | (3) 63-Sum | (4) Output Code & Lines Addressed |
|---|---|---|---|
| Exec. | 1 | 62 | 011111 A, B, C, D, E, |
| Exec. + A | 3 | 60 | 001111 B, C, D, E |
| Exec. + E | 33 | 30 | 011110 A, B, C, D |
| C | 8 | 55 | 111011 Exec., A, B, D, E |

Table VIII illustrates a method of insuring that any or all parties are heard by all others, and not by themselves, (no echo), regardless of the number of parties talking simultaneously. Applying this technique, if no party talks, the result would be:

| (1) Talking Party | (2) Sum | (3) 63-Sum | (4) Output Code |
|---|---|---|---|
| None | 0 | 63 | 111111 |

Figure 5:
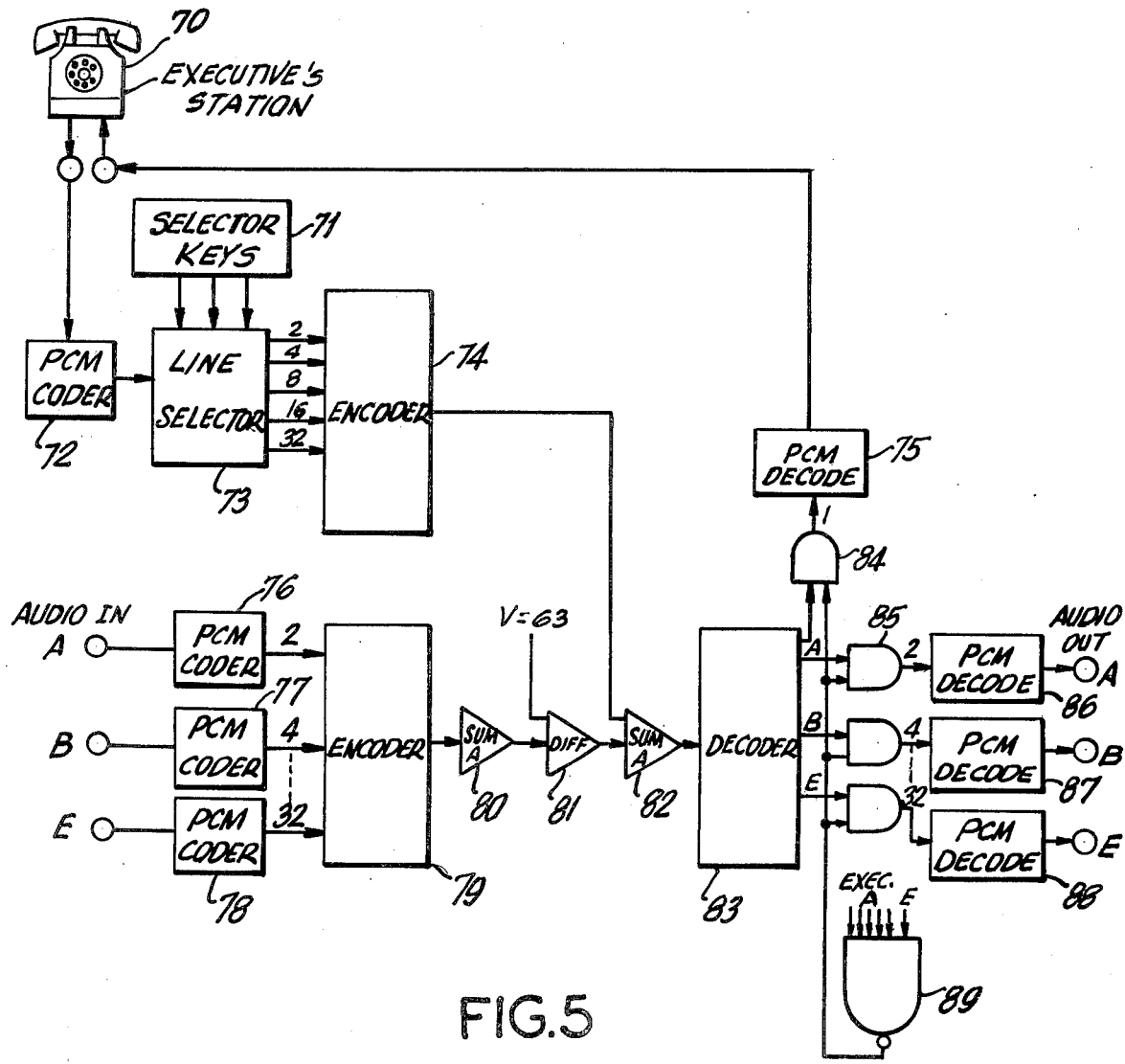
FIG. 5 is a schematic representation of the embodiment shown in FIG. 4.

This result would provide an undesirable output to all listeners when all lines are idle. This output can be easily squelched by simple AND logic to detect the simultaneous "1" on out output lines. The executive conferencing arrangement will now be described in detail with reference to FIG. 5.

Audio input from conferees A, B and E are received at PCM encoders 76-78 and converted into a PCM signal. Encoder 79 weights each PCM signal in accordance with Table VII. Such weighting arrangements have been previously detailed with respect to other aspects of the invention and in the Schimpf patent. The weighted inputs from all talking speakers are summed by summer 80 and this sum is subtracted from 63 (for the example of 6 inputs) by difference amplifier 81. Assuming no input from the executive station via encoder 74 the difference signal is applied to decoder 83.

Decoder 83 generates an output code in accordance with column 4 of Table VIII. Each difference signal requires a separate output code to connect all listeners to all speakers. To generate the necessary code, decoder 83 would require a PAM decoder to produce the binary signal and a ROM to generate the particular output code in response to the decoded PAM binary signal. Such circuitry is well known and has been previously described. The output code is applied to a plurality of AND gates 84, 85, etc., one AND gate for each speaker. Assuming that the output of NAND gate 88 is normally high (logical "1" level) the output code will selectively enable the AND gates and connect the "audio" in (earpiece) PCM decoder of each non-talking conferee to the audio portion of each talking conferee. Thus all speaking parties are heard by all non-speaking parties but not by themselves.

NAND gate 88 serves to prevent an undersirable output when all lines are idle. The inputs to NAND gate 88 are all outputs from decoder 83. If a line is active that input to NAND gate 88 will be low (logical "0"), making the output of gate NAND 88 high and allowing AND gates 84, 85, etc. to be enabled. Alternatively if all lines are idle all inputs to NAND gate 88 are high, the output is low and the AND gates are disabled. Disabling the AND gates serves to squelch the undesirable output to all listeners when all lines are idle.

Executive station 70 has access to the conferencing unit through its own encoder. This is done to allow the executive station access to each conferee to be included in the conference in order to initially set up the conference. Selector keys 71 and line selector 73 permit the executive station to choose a particular party or parties to be included by selecting the particular line desired, weighting the bits with encoder 74 and applying the weighted signal to decoder 83 via summer 82. Decoder 83 decodes the words received from encoder 74 and connects the executive station to the desired party in the manner perviously described.

Although a specific embodiment of this invention has been shown and described, it will be understood that various modifications may be made without departing from the spirit of this invention.

I claim:

1. A digital communications system comprising a plurality of input channels for carrying analog information, means associated with each input channel for serially encoding the analog information into a sequencE of multibit binary words, timing means, controlling each of the encoding means, for ordering the bit position of each multibit binary word such that a predetermined bit in each word is presented at different times to outputs of each of the encoding means, means for converting the multibit binary words from each of the encoding means into multibit digital code words, means for multiplying each bit of each code word with a different analog voltage denoting channel identity, means for summing the different analog voltages and means for transmitting the summed analog voltages over a communications highway to a remote location.

2. A digital communications system in accordance with claim 1, wherein the multiplying means further includes means for multiplying the bits from a first half of the code words with generally positive going analog voltages and the bits from a second half of code words with generally negative going analog voltages, means for extracting a leading half of the positive going analog voltages and a lagging half of the negative going analog voltages and means for combining the leading and lagging halves of the analog voltages for transmission over the communications highway.

3. A digital communications system in accordance with claim 1, further comprising at said remote location, means for sequentially decoding said summed analog voltages into parallel multibit binary codes, each bit in said parallel binary code being associated with one of said plurality of input channels, means for converting said binary code bits into analog information and means for applying said analog information to a plurality of output channels.

4. A digital communications system in accordance with claim 3 wherein said timing means includes means for generating a synchronization signal, means for applying said synchronization signal to a plurality of delay means, each of said delay means further applying said synchronization signal to each of said encoding means delayed by a predetermined interval and each of said delay means providing different amounts of delay.

5. A digital communications system in accordance with claim 1, wherein there is further included means for detecting the presence of logical "1" binary bits in said binary words, means responsive to the presence of more than one logical "1" in a binary word for generating a second digital code word and means for applying said second digital code word to said multiplying means.

6. A digital communications system in accordance with claim 5 wherein said generating means includes a addressable memory means for storing said second digital code words, said addressable memory means being addressed by said digital code words.

7. A digital communications system comprising a plurality of communication channels for carrying analog information, means associated with each communications channel for serially encoding the analog information into a sequence of multibit binary words, means for multiplying the binary word bits from each channel with a predetermined analog voltage, the predetermined analog voltage being different for each channel, means for summing the analog voltages from each channel, means for subtracting the summed voltage from a fixed voltage whose value is dependent on the number of input channels, means responsive to the difference between the fixed voltage and the summed voltage for generating a multibit code word means responsive to each bit in the multibit code word for connecting each communications channel carrying analog information to each communications channel not carrying analog information.

8. A digital communications system in accordance with claim 7 further including means responsive to the absence of analog information on any of the communications channels for disabling the connecting means.

* * * * *